Patented Sept. 5, 1950

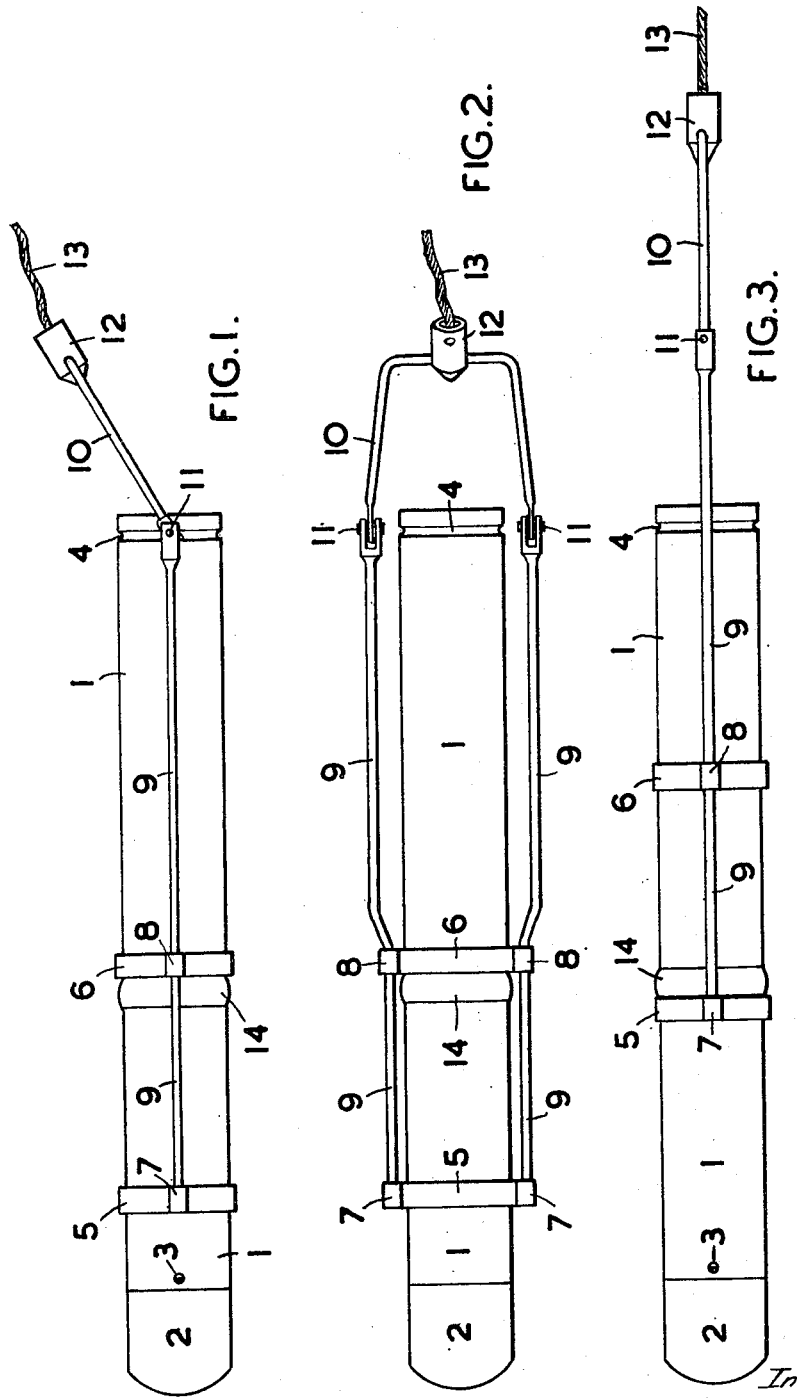

2,521,655

UNITED STATES PATENT OFFICE 2,521,655

TAIL OR BRIDLE FOR ROCKETS

Conrad David Schermuly, Alfred James Schermuly, and Charles Schermuly, Parkgate, Newdigate, England Application December 18, 1945, Serial No. 635,666
In Great Britain December 1, 1944

3 Claims. (Cl. 102—89)

This invention relates to tails or bridles for rockets, of the kind which are secured to one or more bands slidable on the rocket casing, and has for its principal object to provide more efficient and simple means for limiting the rearward movement of the tail or bridle.

According to this invention a rocket comprises a casing, at least one band slidable on said casing and carrying a tail or bridle, and a stop member on said casing intermediate its ends for limiting the rearward movement of said band. When the rocket is in flight the point of attachment of the bridle is rearwardly of the choke end of the rocket.

The stop member may be a band secured to the casing by welding or screwing or the like, or it may be formed by swaging the casing itself.

The invention will now be described with reference to the accompanying drawings which show a rocket in accordance with this invention provided with a bridle, it being understood that a tail unit may be substituted for the bridle.

Figure 1 is an elevation of the rocket with the bridle in forward, or firing, position;

Figure 2 is a plan of the rocket of Figure 1, and

Figure 3 is an elevation of the rocket with the bridle in rearward, or flight, position.

The rocket comprises a metal casing 1 containing the usual rocket composition and closed at the forward end by a wooden plug 2 held in position by screws 3. Instead of the plug 2, the rocket may be provided with a head containing a flare or the like, and the head may if desired be provided with a buoyancy chamber. The casing 1 contains at its rear end the conventional choke, for example cannelured into the casing at 4. Two bands 5, 6 are slidable on the casing 1, the band 5 being essential and the band 6 optional. The bands 5, 6 carry lugs 7, 8 through which pass a pair of rods 9, the rods 9 being welded or otherwise secured to the lugs 7, 8. While a pair of rods 9 is shown and preferred, it will be understood that one single rod 9 may be used.

A bridle 10 is pivoted at 11 to the rear ends of the rods 9, and carries a boss 12 to which is secured a length of wire rope 13 the free end of which (not shown) is looped for attachment to a line.

As an alternative to the pivoted bridle, the rods 9 may terminate in a tail unit for the purpose of steadying the flight of the rocket when the rocket is not of the line-carrying type.

Intermediate the ends of the casing 1, a stop 14 is provided. This stop may take the form of a band screwed, welded or otherwise secured to the casing 1, but in the embodiment shown is formed by swaging the casing 1 itself.

When both bands 5, 6 are present, the stop 14 limits both rearward and forward movement of the bridle. When the band 6 is dispensed with, the stop 14 limits only the rearward movement of the bridle.

When the rocket is to be fired, the end of a line is attached to the wire rope 13, the bridle 10 swung out of alignment with the rods 9 and the bands 5, 6 moved to their forward position with the band 6 abutting against the stop 14, as shown in Figure 1 or 2. In this position the rear end of the casing 1 can be inserted into the barrel of a rocket discharger from which the rocket is to be fired.

When the rocket is fired, it leaves the discharger with considerable force and as soon as the stop 14 strikes the band 5, the bridle will be carried along by the rocket and will assume the position shown in Figure 3. In order to minimise any tendency for the band 5 to bounce forward again after striking the stop 14, the forward edge of the stop is preferably tapered or rounded so that when the band 5 strikes the stop 14 it will bind thereon.

The location of the stop 14 intermediate the ends of the casing leaves the rear end of the rocket free for insertion into a discharger and therefore offers advantages over the provision of a flange on the rear end of the rocket.

We claim:

1. A rocket comprising a casing, a band slidable on said casing and a stop member on said casing intermediate its ends for limiting the rearward movement of the band, said stop member having its forward edge rounded for binding the band to the stop; and a tail or bridle carried on the band, at a point rearwardly of the choke end of the rocket when the band is in its rear position.

2. A rocket comprising a casing, a band slidable on said casing, a stop member on said casing intermediate its ends for limiting the rearward movement of the band, said stop having its forward edge rounded for binding the band to the stop, a rod secured to said band, and a tail or bridle pivotally secured to the rear end of the rod, the point of attachment of said rod and said bridle being rearwardly of the choke end of the rocket when the band is in its rear position.

3. A rocket comprising a casing, a band slidable on said casing and a stop member on said casing approximately midway between its ends for limiting the rearward movement of the band, said stop member having its forward edge rounded for binding the band to the stop; and a tail or bridle carried on the band at a point rearwardly of the choke end of the rocket when the band is in its rear position.

CONRAD DAVID SCHERMULY.
ALFRED JAMES SCHERMULY.
CHARLES SCHERMULY.

REFERENCES CITED

The following references are of record in the file of this patent:

UNITED STATES PATENTS

| Number | Name | Date |
|---|---|---|
| 1,110,507 | Meyers | Sept. 15, 1914 |
| 1,257,126 | Schneider | Feb. 19, 1918 |
| 2,210,820 | Schermuly et al. | Aug. 6, 1940 |

FOREIGN PATENTS

| Number | Country | Date |
|---|---|---|
| 2,136 | Great Britain | of 1894 |